E. M. ERDMANN.
DRAFT APPARATUS.
APPLICATION FILED OCT. 5, 1911.
1,050,439.
Patented Jan. 14, 1913.
2 SHEETS—SHEET 1.
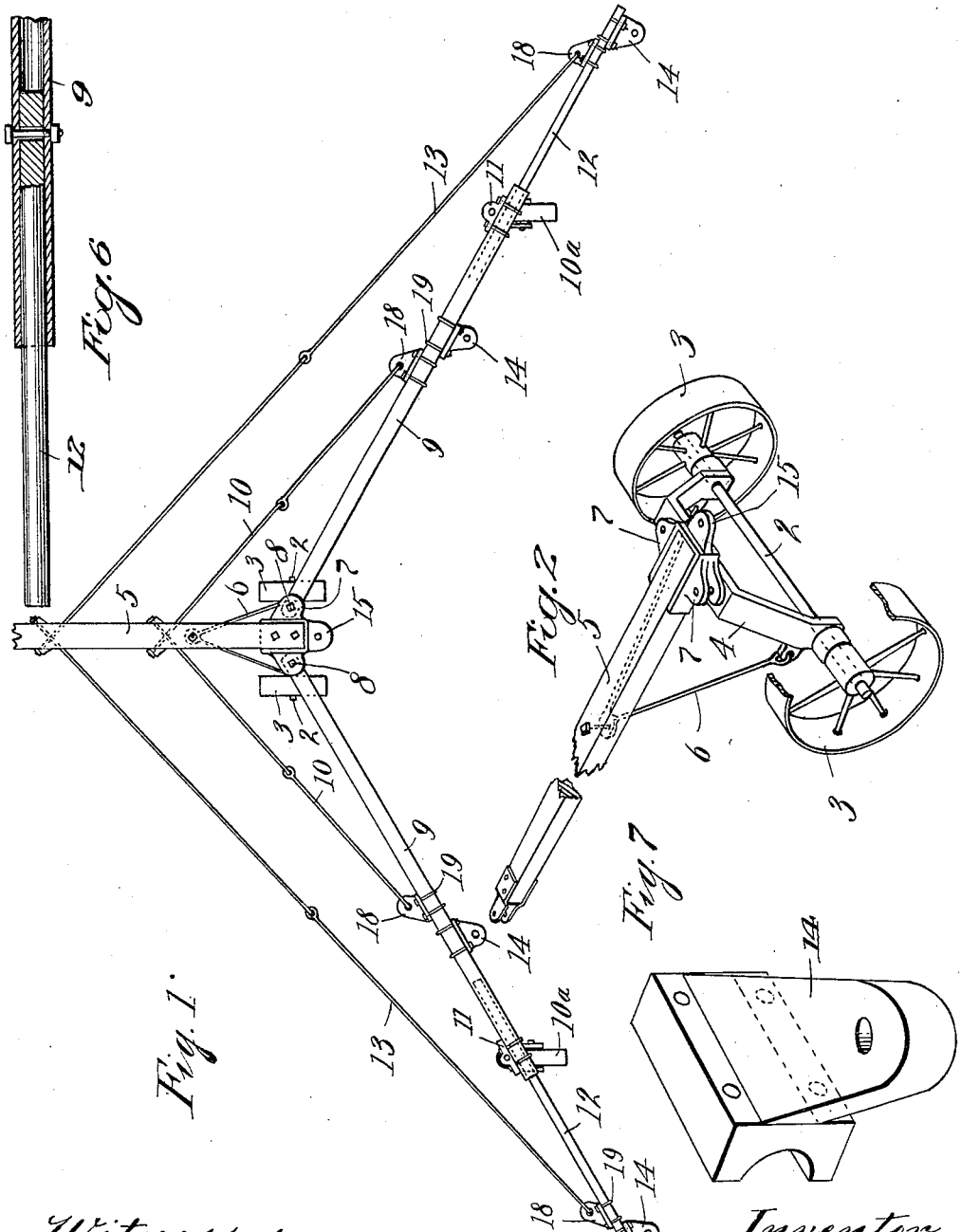
Witnesses,
George Voelker
J. Swanson
Inventor,
Emil M. Erdmann
by Lothrop & Johnson
his Attorneys.

E. M. ERDMANN.
DRAFT APPARATUS.
APPLICATION FILED OCT. 5, 1911.
1,050,439.
Patented Jan. 14, 1913.
2 SHEETS—SHEET 2.
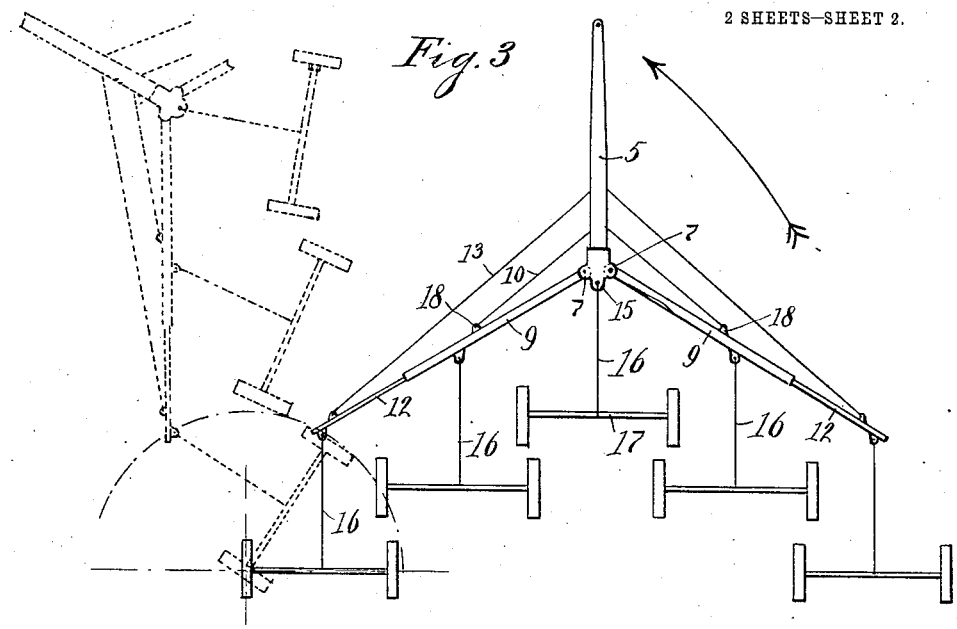
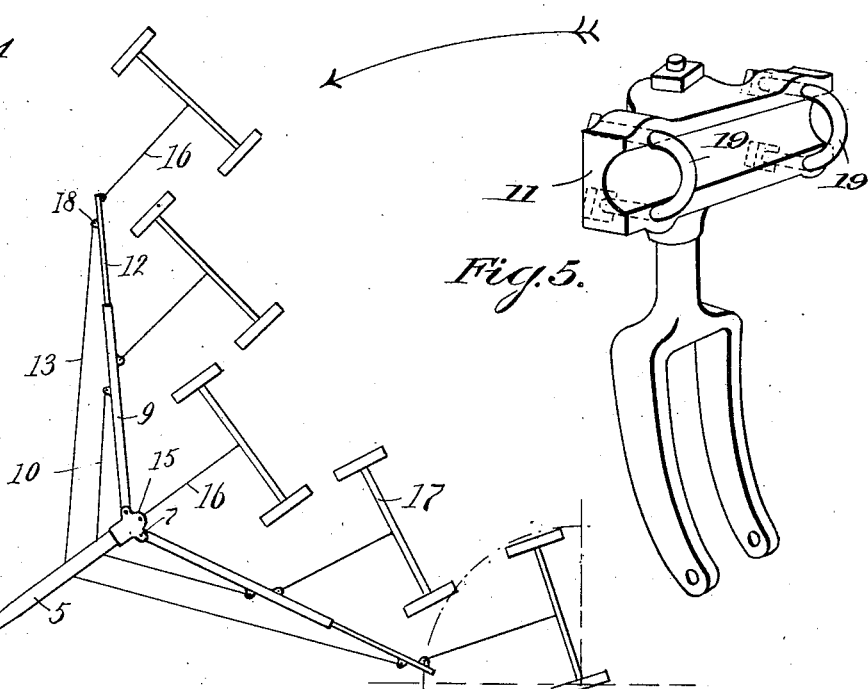
Witnesses,
George Voelker
S Swanson
Inventor,
Emil M. Erdmann
by Lothrop & Johnson
his Attorneys.

UNITED STATES PATENT OFFICE.

EMIL M. ERDMANN, OF LONG PRAIRIE, MINNESOTA, ASSIGNOR TO HANSMANN MANUFACTURING COMPANY, OF LONG PRAIRIE, MINNESOTA, A CORPORATION OF MINNESOTA.

DRAFT APPARATUS.

1,050,439.  Specification of Letters Patent.  Patented Jan. 14, 1913.

Application filed October 5, 1911. Serial No. 652,931.

*To all whom it may concern:*

Be it known that I, EMIL M. ERDMANN, a citizen of the United States, residing at Long Prairie, in the county of Todd and State of Minnesota, have invented certain new and useful Improvements in Draft Apparatus, of which the following is a specification.

My invention relates to improvements in draft apparatus for drills, disk harrows, and the like, its object being to provide means for connecting a plurality of such devices with the tractor, in such way that they will be drawn in parallel paths across the field, and can be turned sharply around at the end of the field without interfering with one another. To this end I have shown the preferred embodiment of the invention in the acompanying drawings forming part of this specification, in which—

Figure 1 is a plan view of the draft apparatus; Fig. 2 is a perspective view of a carriage or tractor to be used therewith; Fig. 3 is a plan view of the apparatus illustrating in dotted lines the positions assumed by the drills or harrows in turning; Fig. 4 is a similar view of the apparatus in partly turned position; Fig. 5 is a perspective view of a wheel caster used in the apparatus; Fig. 6 is a detail sectional view of the telescoping arms; and Fig. 7 is a perspective view of a bracket used in the apparatus.

In the drawings Fig. 2 shows a supporting carriage or tractor including the shaft 2 journaled in wheels 3. Supported upon the axle is an upwardly extending bracket 4 upon which is secured a forwardly extending tongue 5, preferably connected with the bracket by brace rods 6. Extending laterally from the rear end of the tongue are parallel ears 7 forming pivotal supports 8 for the rearwardly diverging arms 9. The arms 9 are adjustably connected with the tongue through the medium of rods 10. The outer ends of the diverging arms 9 are mounted upon carrying wheels 10ª secured to the ends of the arms through the medium of the caster supporting brackets 11. Telescoping in the outer ends of the diverging arms 9 are extension bars 12, said bars being adjustably connected with the tongue through the medium of rods 13. Brackets 14 extend rearwardly from the rear sides of the arms 9 and 12 and a bracket 15 similarly extends rearwardly from the inner end of the tongue, the brackets 14 and 15 forming pivotal supports for the tongues 16 of the drills, or other devices 17 to be drawn. As will be seen from the drawings the brackets 14 as well as the casters 11 which support the wheels 10ª and the brackets 18 which support the rear ends of the rods 10 and 13 are adjustable upon the diverging arms by means of the loops 19 which support the bracket and casters upon said arms.

In operation, the rearwardly extending arms may be adjusted upon their pivotal supports 8 to the desired diverging angle and held in adjusted position by means of the rods 10 and 13. The drills or other devices to be drawn may be supported upon the rear sides of the diverging arms as shown in Fig. 3. The extension bars 12 which form a part of the diverging arms are employed where desired to draw a larger number of devices than would be accommodated by the arms 9. As shown in Figs. 3 and 4 the devices to be drawn are arranged in parallel position and are suitably interspaced rearwardly with respect to each other to asist in holding them out of contact when being turned at the end of the field as indicated in Fig. 4.

The diverging rearwardly extending position of the supporting arms and the adjustable character of the same, permit the arms being so positioned as to allow a plurality of drills or other devices, as shown, to be pivoted directly upon the arms and yet have room enough in which to turn at the end of the field without cramping or interfering with one another, even when turned in a very small circle. This result is accomplished by arranging the drills at different distances from the tractor carriage, and also by arranging their points of pivotal support at different distances from the carriage, and is preferably and most efficiently accomplished by the use of divergent arms as shown in the drawings.

I claim as my invention:

1. An apparatus of the class described comprising a carriage, a pair of diverging rearwardly extending arms supported at their inner ends upon said carriage, and devices to be drawn pivotally connected in parallel position to said arms upon the rear sides thereof.

2. An apparatus of the class described comprising a carriage, a pair of rearwardly extending diverging arms pivotally supported at their inner ends upon said carriage, and a plurality of devices to be drawn, pivotally connected in parallel position to said arms upon the rear sides thereof.

3. An apparatus of the class described comprising a carriage, a pair of rearwardly extending diverging arms pivotally supported at their inner ends upon said carriage, a forwardly extending tongue carried by said carriage, an adjustable connection between said arms and tongue, and a plurality of devices to be drawn connected in parallel position to said arms upon the rear sides thereof.

4. An apparatus of the class described comprising a carriage, a forwardly extending tongue supported by said carriage, a pair of rearwardly extending diverging arms pivotally supported at their inner ends by said carriage, extension arms adjustably supported by the free ends of said pivotally supported arms, means for securing said arms in adjusted diverging positions, and a plurality of devices to be drawn, pivotally connected to said arms on the rear sides thereof.

5. An apparatus of the class described, comprising a carriage, a forwardly extending tongue supported by said carriage, a pair of rearwardly extending diverging arms pivotally supported at their inner ends by said carriage, supporting wheels for the free ends of said arms, means for securing said arms in adjusted diverging positions, and a plurality of devices to be drawn, pivotally connected in parallel position to said arms upon the rear sides thereof, said devices being rearwardly interspaced.

6. An apparatus of the class described comprising a carriage, a plurality of rigid bases of pivotal support carried by, and laterally spaced from, said carriages, said rigid bases of pivotal support being rearwardly interspaced with respect to each other and said carriage, and a plurality of drawn devices pivotally connected with said bases of pivotal support, whereby the devices will relatively swing upon said bases of pivotal support at rearwardly spaced points for the purpose set forth.

7. In combination with a carriage, a pair of outwardly extending transverse arms supported by the carriage, a plurality of rigid bases of pivotal support carried by the arms and forming pivotal supports for a plurality of devices to be drawn in relatively spaced positions rearwardly, whereby the devices to be drawn will relatively swing upon said bases of pivotal support in rearwardly offset positions.

8. In combination with a carriage, a pair of outwardly extending transverse arms supported by the carriage, means for swinging said arms forwardly and rearwardly with respect to said carriage, a plurality of bases of pivotal support for devices to be drawn carried by said arms, said bases of pivotal support being adapted for connection with the devices to be drawn in relatively offset positions rearwardly, whereby said devices will swing upon the pivotal supports in relatively offset positions rearwardly for the purpose set forth.

In testimony whereof I affix my signature in presence of two witnesses.

EMIL M. ERDMANN.

Witnesses:
W. E. LEE,
PAUL HANSMANN.

---

Copies of this patent may be obtained for five cents each, by addressing the "Commissioner of Patents, Washington, D. C."